UNITED STATES PATENT OFFICE.

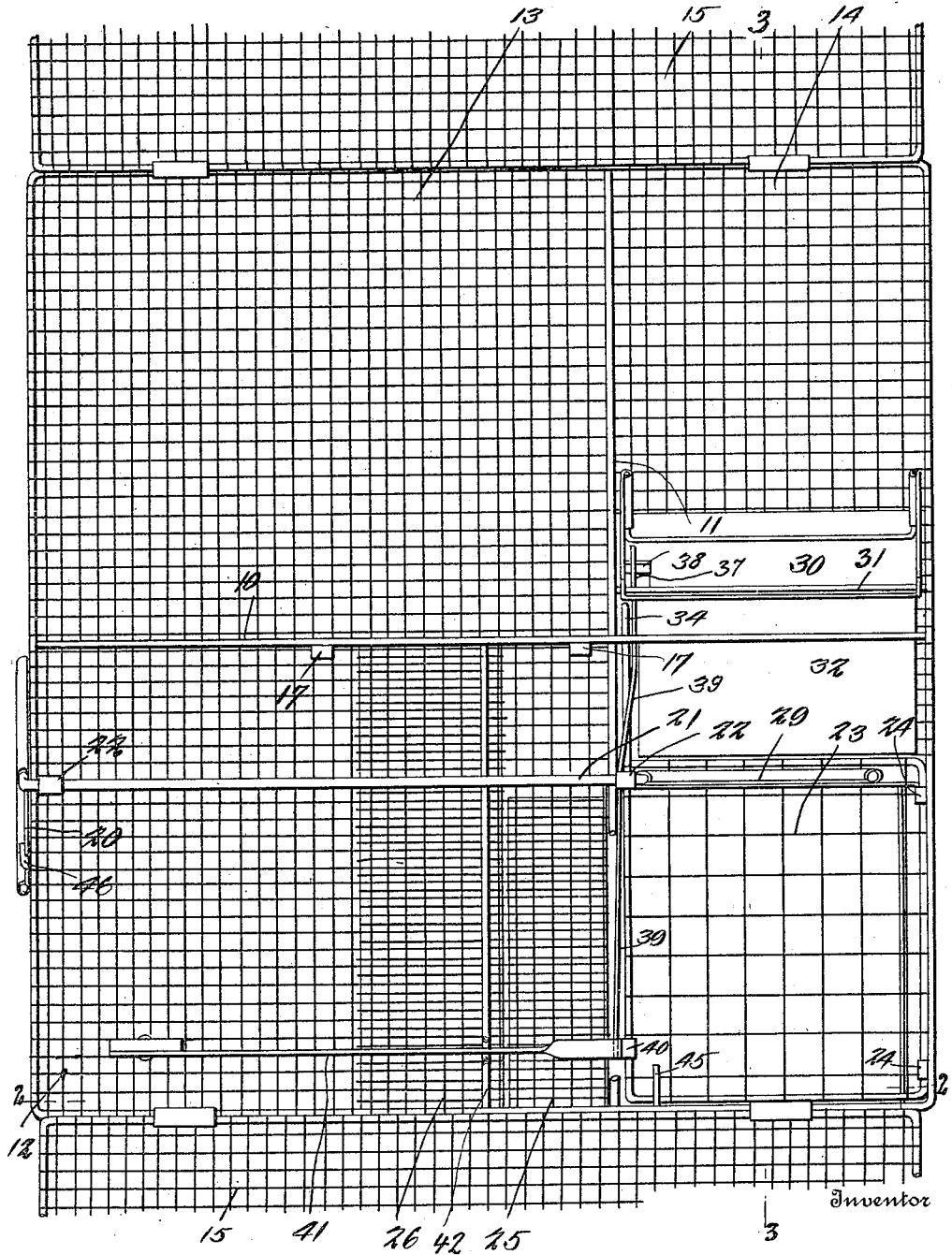

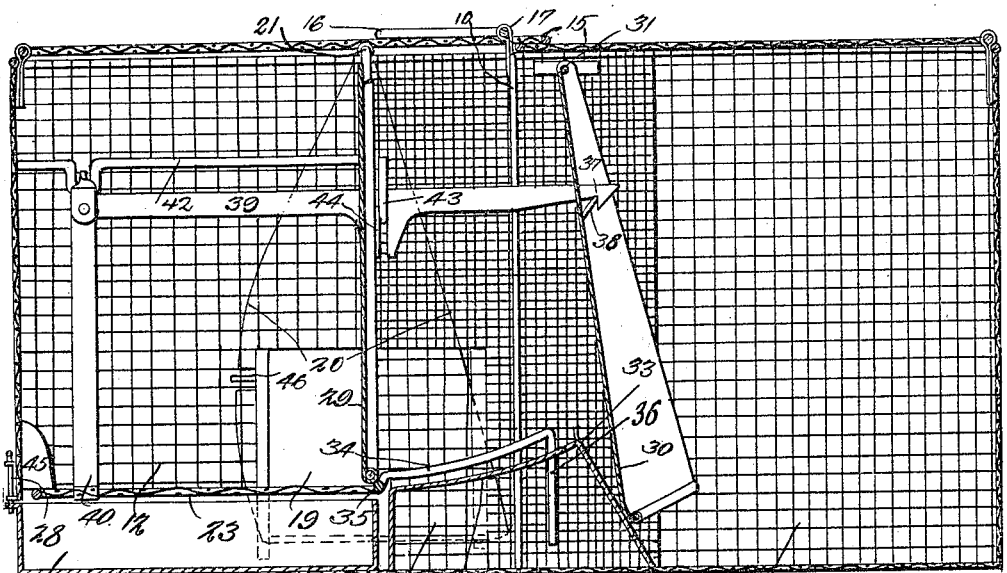
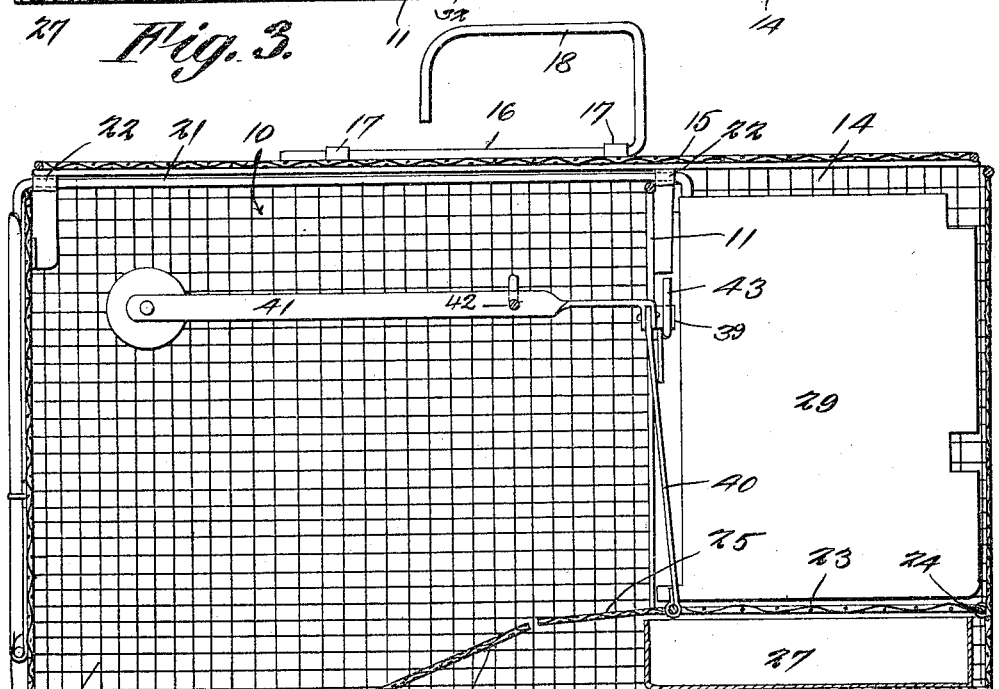

THOMAS J. ELLISON, OF TERRILL, KENTUCKY.

ANIMAL-TRAP.

1,297,667.

Specification of Letters Patent. Patented Mar. 18, 1919.

Application filed December 10, 1918. Serial No. 266,074.

*To all whom it may concern:*

Be it known that I, THOMAS J. ELLISON, a citizen of the United States, residing at Terrill, in the county of Madison and State of Kentucky, have invented new and useful Improvements in Animal-Traps, of which the following is a specification.

This invention relates to animal traps which are re-set by the victim so that a number of animals may be caught in succession after the trap is initially baited and set.

The invention has for its object to provide a very efficient trap of the type stated, and to this end it consists in a novel combination and arrangement of parts to be hereinafter described and claimed.

In order that the invention may be better understood, reference is had to the accompanying drawings forming a part of this specification.

In the drawings,

Figure 1 is a plan view of the trap with the top swung open;

Fig. 2 is a section on the line 2—2 of Fig. 1, and

Fig. 3 is a section on the line 3—3 of Fig. 1.

Referring specifically to the drawings, the trap is in the form of a cage or inclosure constructed preferably but not necessarily, of wire. The cage is divided by a longitudinal partition 10 and a transverse partition 11 into three compartments or chambers 12, 13 and 14, respectively. The chamber 12 is an entrance chamber, and the chamber 13 a victim chamber. The chamber 14 contains certain barriers and re-setting devices to be presently described, and it extends as a passageway across the rear ends of the chambers 12 and 13.

The top of the cage is composed of two hinged doors 15 through which access to the interior is had, said doors being provided with suitable locking means comprising a rod 16 which is insertible through eyes 17 extending upward from the partition 10 and passing through one of the doors, the latter overlapping the other door. The rod 16 is fashioned at one end into a handle 18 so that the trap may be so conveniently carried.

Entrance to the chamber 12 is had through an opening 19 in the front wall thereof, this opening being provided with a swinging closure or door 20 carried by a horizontal rock-shaft 21 journaled in suitable bearings 22 at the top of the cage. The door swings in a vertical plane, and it closes with a downward motion, the opening movement being in the opposite direction.

At the rear end of the chamber 12, the partition 11 has an opening through which the animal passes into the chamber or passageway 14, and the latter opens into the chamber 13.

That end of the passageway 14 into which the rear end of the chamber 12 opens contains a tiltable platform 23 the same being hinged to the rear wall of the cage as shown at 24. This platform has a short downwardly inclined extension 25 into the chamber 12 to facilitate the animal mounting the platform, and in the rear end of the chamber 12 is a short runway 26 leading to the platform extension 25.

The platform 23 is made of wire, and it is located a sufficient distance above the floor of the passageway 14 to enable a bait receptacle 27 to be placed beneath the platform. This bait receptacle is slidable into and out of the cage, through an opening in one of the side walls thereof, and it is held in place beneath the platform by a suitable latch device 28.

The platform 23 is located at one end of the passageway 14, and across the latter, alongside the platform, is located a swinging barrier 29 carried by the rock-shaft 21 and therefore swinging with the door 20 and in the same direction as the latter. A short distance ahead of the barrier 29, the passageway 14 contains a second barrier 30 controlling the escape of the animal from the passageway into the chamber 13, and preventing the animal from returning into the passageway from the chamber 13. The barrier 30 extends across the passageway 14 and it swings in a vertical plane, it being hinged at the top to a cross rod 31 carried by the partition 11 and the rear wall of the cage.

Between the barriers 29 and 30 is a runway 32 elevated a short distance from the floor of the passageway 14 and having an upward incline toward the barrier 30, where it has an abrupt downward bend 33 against which the bottom of the barrier 30 rests when it is down, so that it can swing upward in one direction only. The runway 32 is curved to correspond to the arc in which the bottom edge of the barrier 29 swings, and said edge sweeps along the runway as it swings upward in the direction of the barrier 30.

From one side of the platform 23 extends a rod 34 which lies alongside the runway 32 and has a bend 35 against which the bottom of the barrier 29 abuts when it is down, said bend therefore serving as a stop to prevent the upward swing or opening movement of the barrier, and the latter cannot be swung open until the platform 23 is depressed to lower the part 35 clear of the barrier.

The outer end of the rod 34 has a downward bend 36 which serves as a stop to hold the barrier 29 when it is swung back as the trap is set, the bottom of the barrier resting against said part when it is in this position.

The barrier 30 is held down or in closed position by a latch hook 37 engageable with the edge of a keeper 38 on said barrier. This latch hook is on the outer end of a bar 39 pivotally supported intermediate its ends, and having its other end connected to a post 40 rising from the platform 23. To the post or the last mentioned end of the latch bar is also connected a weighted lever 41 fulcrumed on a cross rod 42 carried by the partition 10 and the side wall of the chamber 12. The pivotal support of the latch bar is a hook 43 carried by the partition 11 and seating in a bottom notch 44 in the bar.

The upward movement of the platform 23 is limited by a stop lug 45 extending inward from the adjacent end wall of the passageway 14, and the downward or closing movement of the entrance door 20 is limited by a stop lug 46 on the front wall of the cage.

To set the trap, the door 20 is opened and the barrier 29 is swung back until its bottom is engaged by the part 36. The latch hook 37 now engages the keeper 38 and holds the barrier 30 down in closed position. As the door 20 and the barrier 29 swing together, the door is locked in open position by the engagement of the part 36 with the barrier 29. The animal can now enter the chamber 12 through the opening 19, and being attracted by the bait in the receptacle 27 steps on the platform 23, which is then depressed. As the platform is depressed the latch bar 39 is swung to release the barrier 30, and at the same time, the part 36 swings down clear of the barrier 29 releasing the latter and allowing it to swing down to vertical position alongside the platform 23, the door 20 also closing and cutting off the escape of the animal through the opening 19. The barrier 29, as it swings down, comes above the part 35, and if the animal steps off the platform back into the chamber 12, the platform rises and the part 35 engages the barrier 29 to lock the door 20 in closed position. However, when the animal is on the platform, the barrier 29 is free to swing rearward and the animal feeling this will push against said barrier in seeking to escape, and as the latter swings rearward its bottom edge rides along that portion of rod 34 which is between the parts 35 and 36 and depresses the same so that the platform 23 is again depressed, and through the post 40 the latch bar 39 is swung to release the barrier 30, so that the animal upon passing forward can also push this barrier upward and escape into the chamber 13. As soon as the animal clears the barrier 30, the latter drops back to closed position and is locked by the latch 37, the barrier 29 in the mean time having dropped back behind the part 36, so that the trap is now re-set with the door 20 open, the latter having swung open as the animal was swinging the barrier 29 upward to pass under the same. That part of the rod 34 between the stops 35 and 36 is curved on such an arc that it is depressed to release the latch 37 as the bottom edge of the barrier sweeps along the same when it is pushed upward by the animal as hereinbefore described. The weighted lever 41 serves to restore the parts to which it is connected to normal position, and the upwardly curved runway 32 between the barriers 29 and 30 across which the barrier 29 sweeps as it swings upward and rearward, takes the animal's weight off the platform 23 before it clears the barriers 29 and 30, thus allowing the platform to rise to locking position.

I claim:

1. An animal trap comprising a cage having separate entrance and victim chambers and a passageway between said chambers, a swinging door for the entrance of the first mentioned chamber, a pair of successively operable swinging barriers in the passageway, the first barrier having a connection with the door to swing simultaneously therewith, a tiltable platform in front of the first barrier, a projecting rod carried by the platform and having stops for holding said barrier in lowered and raised positions, said rod being engageable by the first barrier to depress the platform when said barrier swings from lowered to raised position, a latch for holding the second barrier closed, and a connection between the platform and the latch for releasing the latter when the platform is depressed.

2. An animal trap comprising a cage having separate entrance and victim chambers and a passageway between said chambers, a swinging door for the entrance of the first mentioned chamber, a pair of successively operable swinging barriers in the passageway, the first barrier having a connection with the door to swing simultaneously therewith, a tiltable platform in front of the first barrier, a projecting rod carried by the platform and having stops for holding said barrier in lowered and raised positions, said rod being engageable by the first barrier to depress the platform when said barrier swings from lowered to raised position, a latch for holding the second barrier closed, a connection between the platform and the latch for releasing the latter when the platform is depressed, and an upwardly curved runway between the barriers across which the first barrier sweeps as it swings.

3. An animal trap comprising a cage having separate entrance and victim chambers and a passageway between said chambers, a swinging door for the entrance of the first mentioned chamber, a pair of successively operable swinging barriers in the passageway, the first barrier having a connection with the door to swing simultaneously therewith, a tiltable platform in front of the first barrier, a projecting rod carried by the platform and having stops for holding said barrier in lowered and raised position, said rod being engageable by the first barrier to depress the platform when said barrier swings from lowered to raised position, a latch for holding the second barrier closed, a connection between the platform and the latch for releasing the latter when the platform is depressed, and an upwardly curved runway between the barriers across which the first barrier sweeps as it swings, the forward end of the runway being engageable by the second barrier and serving as a stop for the same when it is down.

4. An animal trap comprising a cage having separate entrance and victim chambers and a passageway between said chambers, a swinging door for the entrance of the first mentioned chamber, a pair of successively operable swinging barriers in the passageway, the first barrier having a connection with the door to swing simultaneously therewith, a tiltable platform in front of the first barrier, a projecting rod carried by the platform and having stops for holding said barrier in lowered and raised positions, said rod being engageable by the first barrier to depress the platform when said barrier swings from lowered to raised position, a pivoted latch bar for holding the second barrier down in closed position, a post rising from the platform and connected to the latch bar for controlling the same, and a weighted lever connected to the post.

In testimony whereof I affix my signature.

THOMAS J. ELLISON.

Copies of this patent may be obtained for five cents each, by addressing the "Commissioner of Patents, Washington, D. C."